March 26, 1968 J. L. KELLY ET AL 3,375,011

DUAL DETENT MECHANISM FOR A PORTABLE RECORDER-REPRODUCER

Filed Jan. 25, 1967 3 Sheets-Sheet 1

INVENTORS
JACK L. KELLY
RONALD K. WIANDT

BY Thomas A. Briody
ATTORNEY

DUAL DETENT MECHANISM FOR A PORTABLE RECORDER-REPRODUCER

Filed Jan. 25, 1967 3 Sheets-Sheet 2

INVENTORS
JACK L. KELLY
RONALD K. WIANDT

BY Thomas A. Briody
ATTORNEY

INVENTORS
JACK L. KELLY
RONALD K. WIANDT

BY Thomas A. Briody
ATTORNEY

United States Patent Office 3,375,011 Patented Mar. 26, 1968

3,375,011
DUAL DETENT MECHANISM FOR A PORTABLE RECORDER-REPRODUCER

Jack L. Kelly and Ronald K. Wiandt, Decatur, Ill., assignors to General Electric Company, a corporation of New York Filed Jan. 25, 1967, Ser. No. 611,711
8 Claims. (Cl. 274—23)

ABSTRACT OF THE DISCLOSURE

A detent mechanism for a recording and reproducing device, which involves the resilient cooperation of a single detent element with a recording arm and a playback arm.

This invention relates to portable recording and reproducing devices, and more particularly to a dual detent mechanism for the stylus carrying recording and playback arms of such devices.

In prior art portable recording and reproducing devices which employ separate recording and reproducing "tone" arms, since the device must be readily carried, two separate detent mechanisms have been provided to ordinarily maintain each arm in a predetermined position while the device was being transported. These mechanisms, of course, add to the total expense of the device. Accordingly, it has been found desirable to provide a new and improved detent mechanism for such a device which more effectively and economically maintains the two "tone" arms in their carrying or rest positions.

Another object of this invention is to structure an improved detent mechanism which operates in a novel fashion to retain two phonograph arms in their carryable positions.

A further object of the present invention is to provide an improved portable recording and reproducing device which incorporates a novel detent mechanism.

Still another object of this invention is to provide an improved detent mechanism for a recording and reproducing device, which mechanism is low in cost.

In carrying out our invention in one form thereof, there is provided a portable recording and reproducing device including a supporting housing and a turntable rotatably supported on the housing for carrying a disc type record. A stylus carrying recording arm and a stylus carrying playback arm are provided for recording and reproducing sound relative to the record. The recording arm and playback arm are arranged relative to each other so that they are in generally parallel and contiguous relationship when in their "rest" position. With such an arrangement of the arms, a single detent element is secured to the housing and arranged to support and cooperate with both of the arms for either severally or conjointly positively biasing the arms into their rest positions. Such a detent arrangement is both simplified in operation and economical in cost.

By further aspects of the present invention, additional desirable features may be included in the recording and reproducing device, and the specification concludes with claims particularly pointing out and distinctly claiming the subject matter which we regard as our invention. The invention, however, as to organization and method of operation, together with further objects and advantages thereof, may best be understood by reference to the following description when taken in conjunction with the accompanying drawings, in which:

Figure 1:
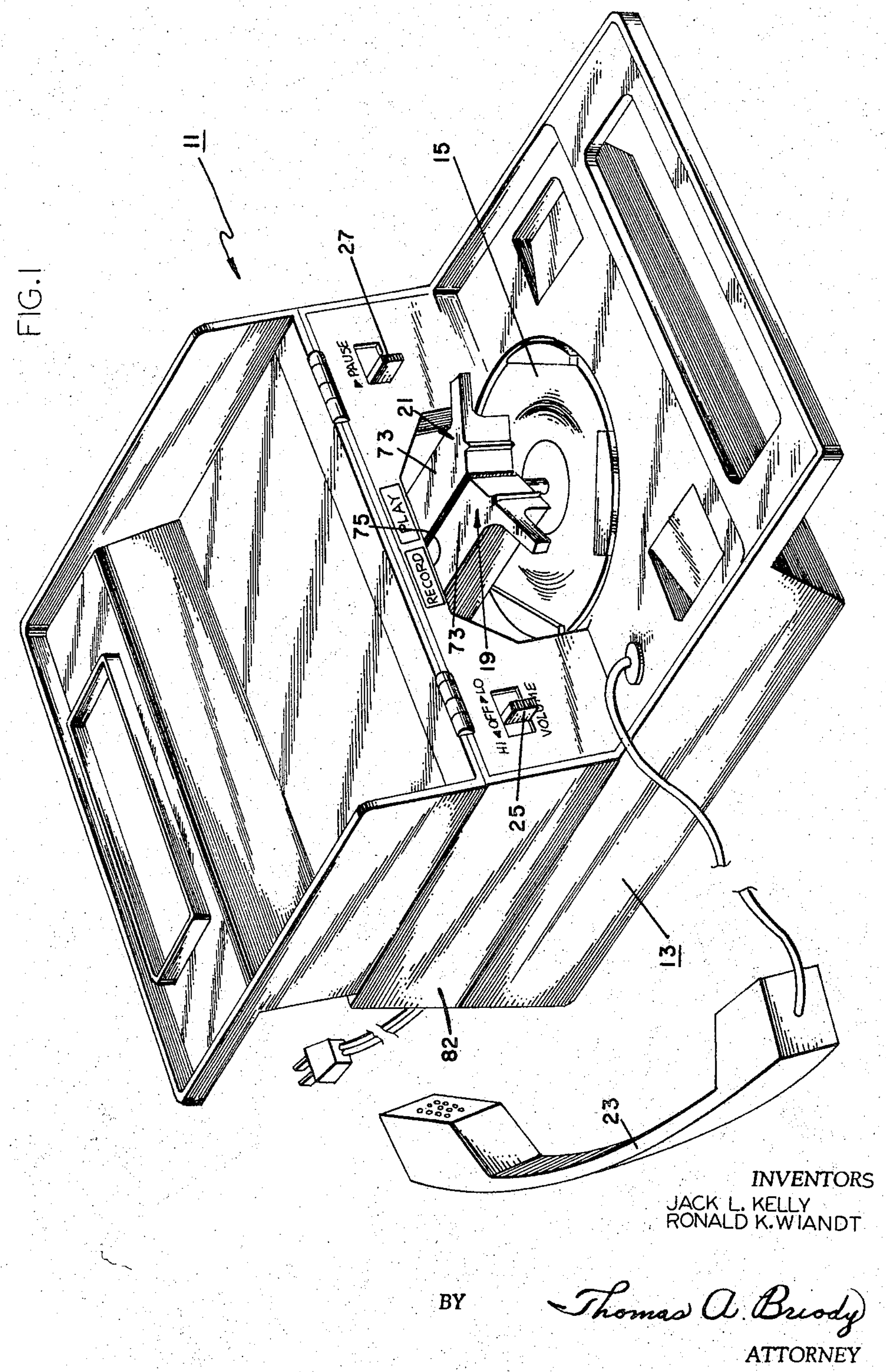
FIGURE 1 is a perspective view of an embossable disc-type recording and reproducing device embodying the present invention, in one form thereof.

Referring in detail to the drawings, and initially in particular to FIGURE 1 thereof, there is shown a disc-type recording and reproducing device 11 embodying one form of our invention. The recording device 11 essentially comprises a three part housing 13 wherein turntable 15 and its driving motor (not shown) are located, recording arm 19 and its associated recording head, playback arm 21 and its associated playback head, an amplifier (not shown) and a combination speaker-microphone type of handset 23. For controlling the device 11 there is also provided an "on-off" and "volume" control knob 25 and a "pause" control knob 27. Knob 27 is thus for selectively coupling and uncoupling the driving motor to the turntable 15 for facilitating desired momentary interruption of its movement.

For expeditiously maintaining the recording arm 19 and the reproducing arm 21 of device 11 in a "rest" position, in accordance with our invention there is provided an improved detent mechanism 31. This improved detent mechanism 31 which exemplifies the present invention is set forth in detail in FIGURES 2–7. As shown therein, for maintaining the recording arm 19 and the playback arm 21 in their "rest" positions, a single specially constructed molded plastic detent element 33 is provided.

For an understanding of the structure and mode of operation of our new and improved detent mechanism 31, first a description of the recording and reproducing arms 19 and 21 is deemed necessary. Recording arm 19 is of one piece molded plastic construction, and it includes an enlarged recessed end portion 35 (FIGURE 2) within which the recording head (not shown) is positioned. To facilitate optimum space utilization in device 11 and relative lightness for the overall construction of arm 19, the rectangularly configured recessed end portion 35 of arm 19 is connected to its supported end (not shown) by a more slender rectangularly configured and elongated intermediate portion 37. Further details concerning the structure and configuration of recording arm 19 are included in the copending application, Ser. No. 609,579 of the inventors Kelly et al., filed on Jan. 16, 1967.

The rectangular enlarged portion 35 of recording arm 19 is integrally connected to the slender intermediate portion 37 by means of a pair of vertical shoulders **39*a* and 39*b*, the shoulder 39*a* being located on the side of arm 19 away from arm 21, and the shoulder 39*b* being located on the side of arm 19 closest to arm 21**.

Figure 2:
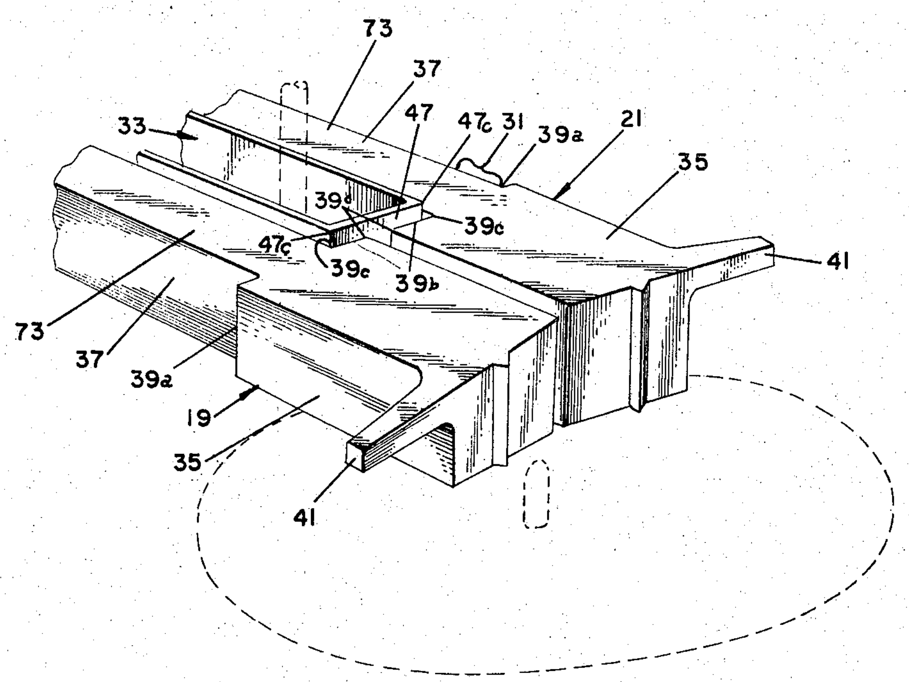
FIGURE 2 is a fragmentary perspective view of the recording and playback arms of the device, in cooperative association with the detent element.

Playback arm 21 is structured similarly to recording arm 19. Thus, arm 21 is also of one-piece molded plastic construction and it includes an enlarged rectangularly configured recessed end portion 35 wherein a reproducing head is positioned, and a more slender rectangularly configured intermediate portion 37 connected to portion 35 by vertical shoulders **39*a* and 39*b* (see FIGURES 2 and 3). Playback arm 21 and recording arm 19 differ in construction notably in that each arm includes a manually graspable finger 41 that faces angularly away from the other arm. Thus, as best shown in FIGURE 2, finger 41 of arm 19 extends laterally sideways, forwardly, and away from arm 21, and finger 41 of arm 21 extends laterally sideways, forwardly, and away from arm 19. The fingers 41 of the respective recording and playback arms 19 and 21 enable the user of the recording device 11 to readily manipulate either of the arms 19, 21** into its desired "rest" or "operational" positions, as shall become further apparent hereinafter.

Turning now to an explanation of the structure of the detent element 33, attention is directed in particular to FIGURES 3, 5, 6 and 7 of the drawings. As shown therein, the detent element 33 is of one-piece molded plastic construction. For example, element 33 may be made advantageously and economically from Dupont's Nylon Zytel No. 101. As shown most clearly in FIGURES 5–7, the plastic element 33 essentially comprises a rectangularly configured body section 43 having a bottom 45, front wall 47 and elongated opposed side walls 49, 51; a pair of tongues 53 and 55 which extend forwardly from front wall 47 at its bottom; and a rearward extension 57 of the bottom 45. Body section 43 of element 33 thus has the general configuration of an elongated box which is open at its top and rear; the opposed side walls 49, 51 being disposed vertically and having their front ends in conterminous relationship with front wall 47. The rearward extension 57 is provided in element 33 for the purpose of helping to secure the element 33 to the top wall of housing 13, as will be further explained hereinafter.

Figure 3:
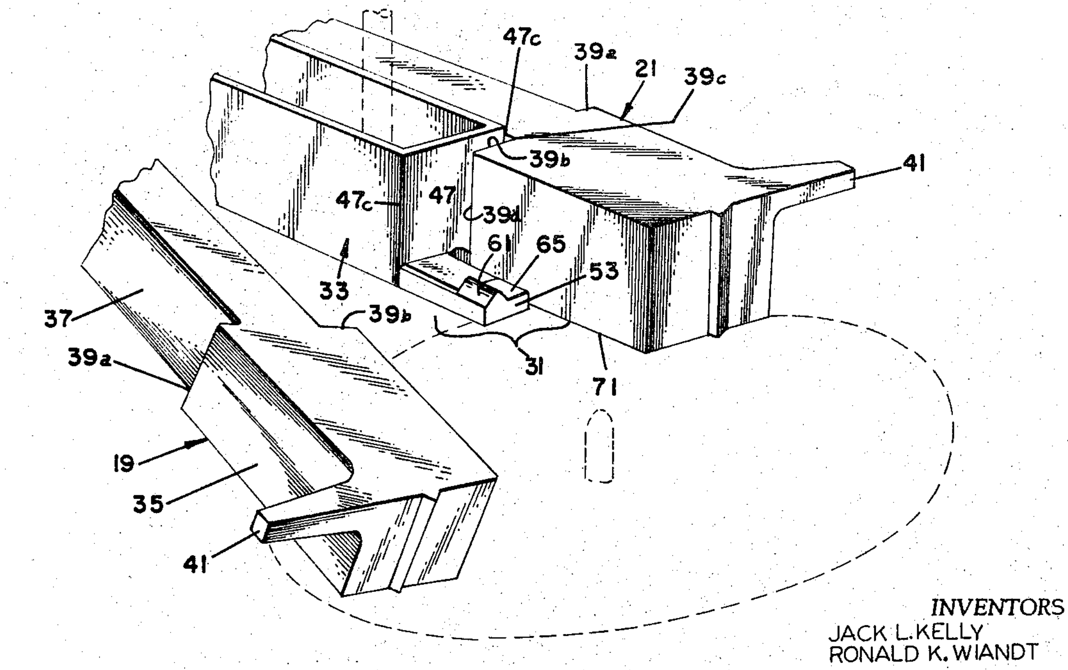
FIGURE 3 is a fragmentary perspective view similar to FIGURE 2, but with the recording arm uncoupled from the detent element and in operative position on a record.

The tongues 53 and 55 each extend forwardly from front wall 47 (as shown in FIGURE 3) of the detent element 33, and they are in generally coplanar relationship with bottom 45 thereof. More particularly, the tongues 53 and 55 are parallel to each other and are spaced apart by slot 59. The bottom surfaces **53*a*, 55*a* of the tongues 53 and 55 represent coplanar continuation surfaces relative to the bottom surface of body section 43. The top or upwardly facing surface of each of the tongues 53, 55 includes a flat uninterrupted supporting area connected to a detent portion. Thus, more particularly for tongue 53, its top surface includes flat supporting area 53*b* connected to detent portion 53*c*. For tongue 55, its top surface includes flat supporting area 55*b* connected to detent portion 55*c***.

The detent portions **53*c* and 55*c* are each specially and identically constructed to include an outwardly disposed inclined surface 61 for enabling the associated arm to ride upwardly toward its detented position, an inner inclined surface 63 for enabling the associated arm to ride downwardly toward its detented position, and horizontal surface 65** for vertically maintaining the associated arm in its detented or restrained position.

Figure 4:
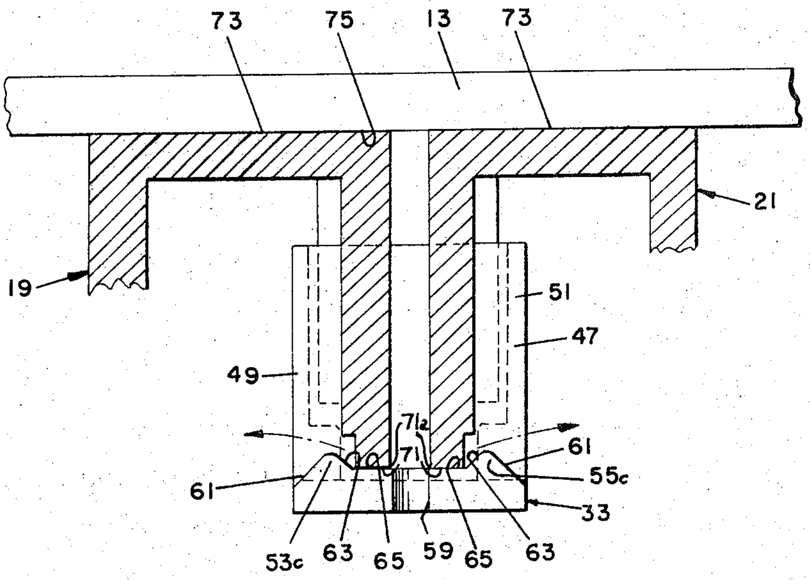
FIGURE 4 is an enlarged fragmentary front view of the recording and playback arms together with their detent mechanism, both arms being shown in section and in their detented positions.
Figure 5:
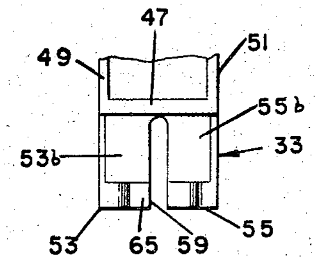
FIGURE 5 is a fragmentary plan view of the detent element, showing its two detent portions.
Figure 6:
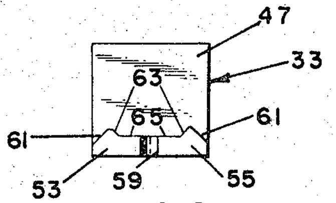
FIGURE 6 is a front elevation view of the detent element, showing its two detent portions.

Turning now to a detailed description of the operation of the improved detent mechanism of the present invention, attention is directed to FIGURES 1–4. When the recording and reproducing device is not being used or is being stored, the recording arm 19 and the playback arm 21 are located in their "rest" positions, wherein they are shown in FIGURES 1, 2, and 4. For the "rest" position, vertical inside corner **39*c* (FIGURE 2) of each of the arms 19, 21, which is located adjacent vertical shoulder 39*b*, is contiguous to an associated front vertical corner 47*c* (FIGURE 3 also) of the detent element 33 (FIGURES 2 and 3), and the vertical outside corners 39*d* of the arms 19, 21 are disposed closely adjacent to each other and in front of the middle of front wall 47 of the detent element. The inside bottom surface 71 of each of the arms 19, 21 (FIGURE 4) thereupon rests on horizontal surface 65 of an associated detent portion 53*c* or 55*c*, and the top 73 of each arm engages an overhanging surface 75 of the phonograph housing 13**.

With the arms 19 and 21 in their "rest" positions, the tongues 53 and 55 operate as resilient cantilevers secured to their supporting body 43, and the detent portions **53*c* and 55*c* are flexed downwardly a small amount. However, detent portions 53*c*, 55*c* of the tongues 53 and 55 tend to return to their normal position, and as a result thereof, horizontal surfaces 65 of the tongues 53 and 55 each compress their associated arm into firm engagement with transversely overhanging housing surface 75. Putting this another way, it may be stated that when the recording arm 19 and the playback arm 21 are in their "rest" positions, both arms are sandwiched into compression between the detent element 33 and housing 13 by means of the resilient tongues 53 and 55**.

For removing either recording arm 19 or playback arm 21 from its "rest" position, a lateral or horizontal thrust is exerted thereupon by grasping finger 41 and pulling the arm horizontally outwardly and away from its central overlying relationship above the spindle of the turntable 15. More particularly, if it is desired to move recording arm 19 from its "rest" position (FIGURE 2) to its operating position (FIGURE 3), the adjacent inner edge of the bottom surface 71 (FIGURE 4) of the arm 19 thereupon first engages the inner inclined surface 63 (FIGURE 4) of the detent portion **53*c* and cams the associated detent portion 53*c* downwardly until surface 71 of the recording arm 19 escapes its detent position by reaching the outer inclined surface 61 of the detent portion 53*c*. The previously engaged detent portion 53*c* thereupon resiliently flexes itself upwardly and back to its normal position and the recording arm 19 is free for vertical or horizotnal movement incident to its function for the phonograph device 11** (see FIGURE 3).

When it is desired to return the recording arm 19 from its "operative" to its "rest" position, the arm is first moved upwardly and toward the center of the phonograph unit 11 above the spindle of the turntable; i.e. from its FIGURE 3 position toward its FIGURE 2 position. The lower and outer longitudinal edge **71*a* (FIGURE 4) of arm 19 (adjacent surface 71) then is placed initially into engagement with the outer inclined surface 61 of detent portion 53*c* of tongue 53. As the recording arm 19 is moved laterally further to the right (e.g. from its FIGURE 3 position to its FIGURE 2 position), the longitudinal bottom edge 71*a* of arm 19 exerts a force upon inclined surface 61 of tongue 53 to resiliently flex and cam the tongue downwardly until the bottom surface 71 of arm 19 has passed the peak of the detent portion 53*c* and is disposed inwardly thereof. The recording arm 19 is thus returned to its "rest" position (FIGURE 4) wherein inside corner 39*c* of the arm (FIGURE 2) is contiguous to corner 47*c* of the detent element 33, and bottom surface 71 of the arm engages horizontal surface 65 of the tongue 53. The recording arm 19 is thus again sandwiched in compression between detent tongue 53 and housing surface 75 of the phonograph device 11** (see also FIGURE 1).

The playback arm 21 may be selectively placed on its "rest" position (shown in FIGURE 2), removed therefrom to its "operating" position (not shown) and returned to its "rest" position in essentially the same manner as described hereinbefore for the detenting operation of recording arm 19, the only exception being that the playack arm 21 is moved in generally opposite directions correlative to the directions required for moving recording arm 19 to and from its "rest" position.

As a result of the location of slot 59 between the two resilient tongues 53 and 55, each one of these tongues is thus allowed to flex individually relative to its associated "tone arm" without in any way significantly effecting the detenting relationship between the other tongue and its associated tone arm.

Figure 8:
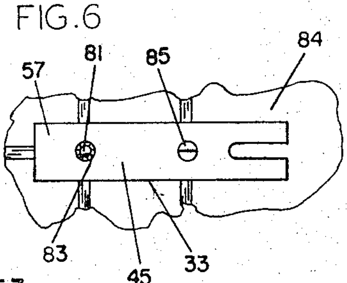
FIGURE 8 is a fragmentary view showing the mounting arrangement for securing the detent element to the device housing.
Figure 7:
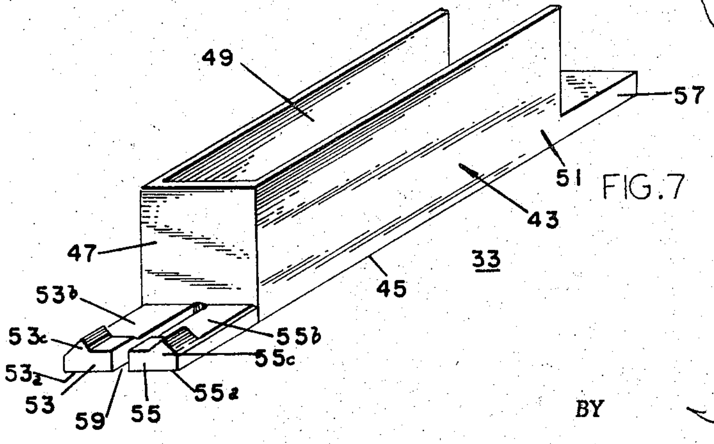
FIGURE 7 is a perspective view of the detent element embodying the present invention.

FIGURE 8 shows the technique employed for securing detent element 33 of the present invention to the housing 13. More particularly, as shown therein, there is a depending boss 81 formed in the bottom 84 of the top horizontal wall of housing superstructure 82 (FIGURE 1). Boss 81 cooperates with a circular slot 83 formed in supporting extension 57 of the detent element 33, thereby to laterally locate one end of element 33 in relationship to housing 13. Screw 85 is extended through another aperture (not shown) formed in the bottom 45 of element 33, and this screw is threaded into engagement with another boss (not shown) formed in the bottom 84 of the top horizontal wall of superstructure 82, thereby to securely fasten element 33 to housing 13.

It will now, therefore, be seen that our new and improved detent mechanism is simplified in structure, novel in operation, and economical in cost.

While in accordance with the patent statutes, we have described what at present is considered to be the preferred embodiment of this invention, it will be obvious to those skilled in the art that various changes and modifications may be made therein without departing from this invention, and therefore, we aim in the following claims to cover all such equivalent variations as fall within the true spirit and scope of this invention.

What we claim as new and desire to secure by Letters Patent of the United States is:

1. In a recording and reproducing device, a support, a turntable arranged on said support for carrying a record member, driven means for rotating said turntable and said record member, a stylus carrying recording arm for forming a sound responsive impression in said record member, said stylus carrying recording arm being movable from its operative position to a rest position above and adjacent the center of said turntable, a stylus carrying playback arm for reproducing sound from the sound grooves of a record member, said playback arm being movable from its operative position to a rest position above and adjacent the center of said turntable, and unitary detent means secured to said support and cooperating with said recording and reproducing arms either severally or conjointly for positively biasing said arms into their rest position.

2. In a recording and reproducing device, a support, a turntable arranged on said support for carrying a record member, driven means for rotating said turntable and said record member, a stylus carrying recording arm for forming a sound responsive impression in said record member, said stylus recording carrying arm being movable from its operative position to a rest position above and adjacent the center of said turntable, a stylus carrying playback arm for reproducing sound from the sound grooves of a record member, said playback arm being movable from its operative position to a rest position above and adjacent the center of said turntable, said recording arm and said playback arm being disposed in generally parallel and contiguous relationship when in their rest position, and unitary detent means secured to said support and cooperating with said recording and reproducing arms either severally or conjointly for positively biasing said arms into their rest position.

3. The device of claim 1 wherein said unitary detent means is structured to include a pair of integral resiliently operable tongues, each of said tongues being adapted to resiliently coact with an associated one of said arms thereby to restrain said arm in its rest position.

4. The device of claim 2 wherein said unitary detent means comprises a pair of integral resiliently operable tongues; each of said tongues including a horizontal surface for compressibly engaging an associated arm when said arm is in its rest position, a first inclined surface for resiliently coacting with said associated arm during lateral movement of said arm away from its rest position thereby to uncouple said detent means from said arm, and a second inclined surface for resiliently coacting with said associated arm during lateral movement of said arm toward its rest position thereby to couple said detent element to said associated arm.

5. The device of claim 4 wherein each of said arms is disposed in sandwiched relationship between an associated one of said resilient detent tongues and an overlying surface of said device support when each said arm is in its rest position.

6. The device of claim 5 wherein each said arm includes an inside vertically disposed corner in contiguous relationship to an associated outside corner of said detent means when each said arm is in its rest position.

7. The device of claim 6 wherein said detent means has a generally rectangular body portion.

8. The device of claim 7 wherein each of said arms has a generally rectangular configuration, each said arm also including an enlarged head supporting portion and an intermediate slender portion disposed between the head supporting portion and the supported end of said arm, said arms while located in their rest positions being disposed in parallelism with an elongated rectangular slot disposed between the slender portions of said arms, said rectangular body portion of said detent means being cooperably disposed in said rectangular slot when said arms are both in their rest positions, thereby to provide a compact overall arrangement.

No references cited.

HARRY N. HAROIAN, *Primary Examiner.*